March 9, 1943.  M. A. EDWARDS  2,313,526
ELECTRIC CIRCUIT
Filed Oct. 17, 1940  2 Sheets-Sheet 2
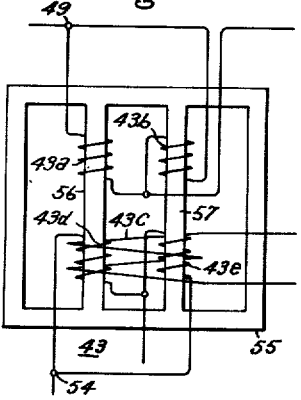
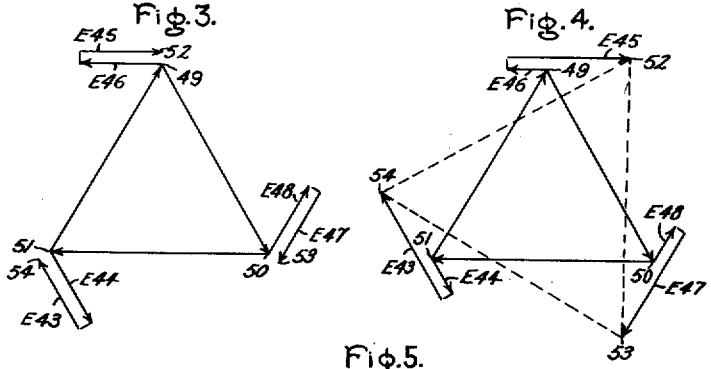
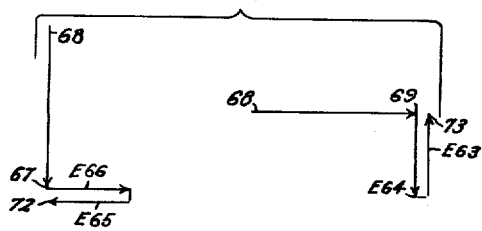
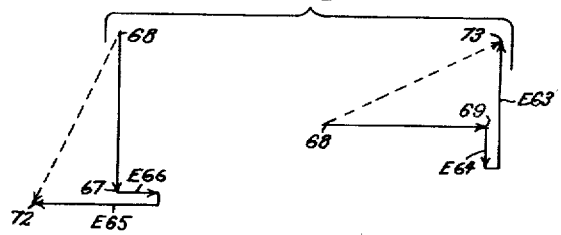
Inventor:
Martin A. Edwards,
by Harry E. Dunham
His Attorney.

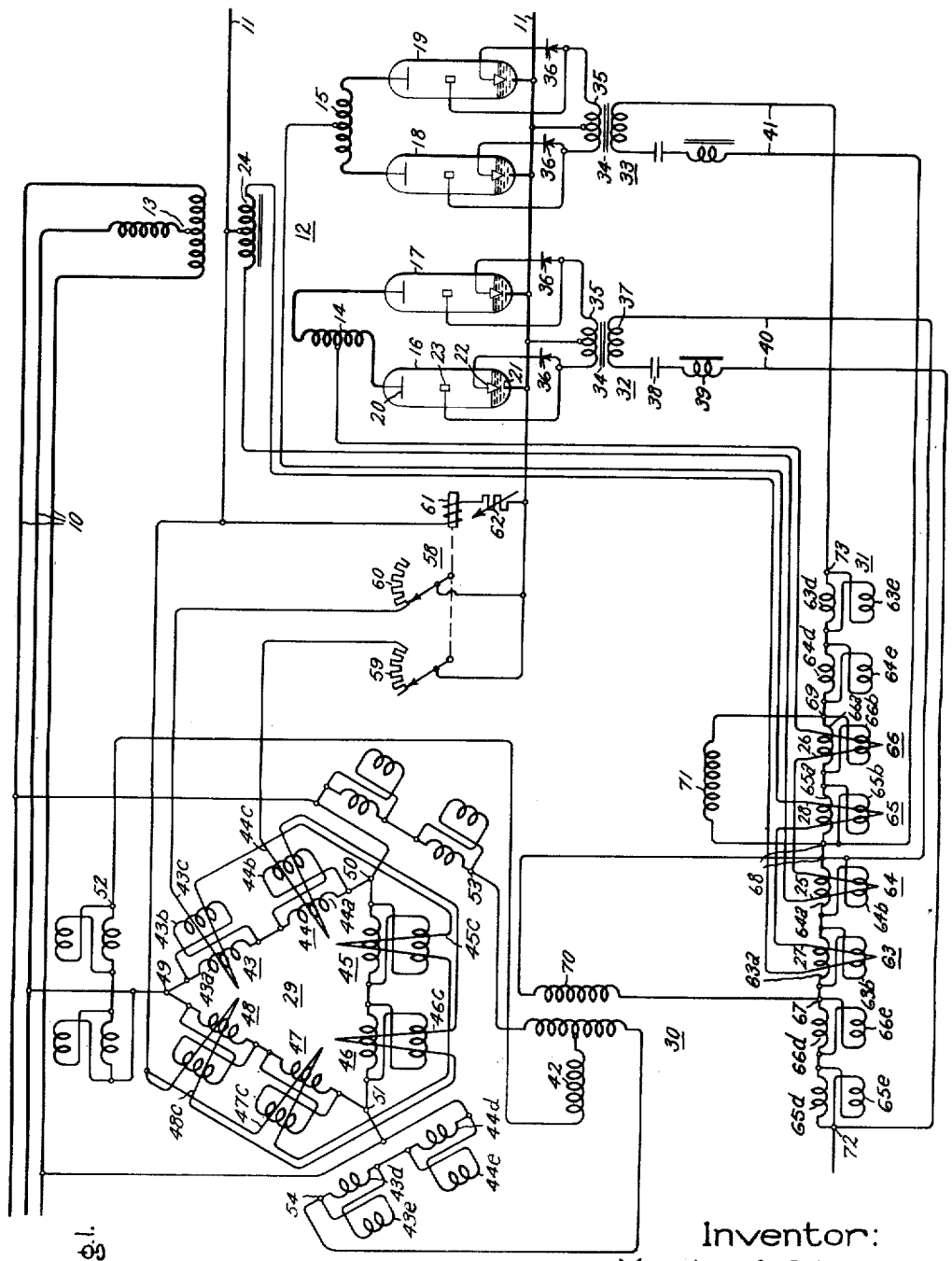

Patented Mar. 9, 1943

2,313,526

UNITED STATES PATENT OFFICE 2,313,526

ELECTRIC CIRCUIT

Martin A. Edwards, Scotia, N. Y., assignor to General Electric Company, a corporation of New York Application October 17, 1940, Serial No. 361,600

18 Claims. (Cl. 175—363)

The present invention relates to electric circuits and more particularly to electric valve converting systems and improved control circuits therefor.

In electric circuits employing controlled electric valves for transferring energy between two circuits of different electrical characteristics, such as between alternating and direct current circuits or between alternating current circuits of different frequencies, it is desirable to vary the phase of the excitation potentials in order to control an electrical condition of one of the circuits such as the voltage of the load circuit and also where a plurality of electric valves are operated in parallel to maintain a predetermined distribution of load current between the valves. Heretofore, phase shifting circuits have been proposed for obtaining a division of load between parallel operating electric valves and for controlling an electrical condition of one of the circuits interconnected by the electric valve system. However, it has been apparent to those skilled in the art that it would be desirable to have simpler and more reliable phase shifting circuits for accomplishing this type of control. In many circuits of the prior art the amount of phase shift for a given controlling influence is dependent upon the current drawn from the phase shifting circuit.

It is an object of my invention to provide a new and improved phase shifting circuit.

It is another object of my invention to provide a new and improved electric valve converting system.

It is another object of my invention to provide an improved phase shifting circuit in which the phase shift produced is substantially independent of the current drawn from the circuit.

It is a further object of my invention to provide an improved electric valve converting system in which division of load between parallel operating valves is insured.

It is a still further object of my invention to provide an improved excitation circuit for an electric valve converting system for automatically controlling the conductivities of the electric valves to maintain a predetermined electrical condition of one of the circuits interconnected by the electric valve system as well as insuring a division of load between the parallel operating electric valves.

In accordance with the illustrated embodiment of my invention, a quarter-phase electric valve translating system interconnects an alternating current supply circuit and a direct current load circuit. The electric valves are provided with excitation circuits including a phase shifting circuit embodying the present invention which is controlled in accordance with the voltage of the direct current circuit, and a second phase shifting circuit which is controlled in response to the current conducted by each group of valves of the electric valve translating apparatus to maintain a predetermined division of load current between the groups of valves. In accordance with the illustrated embodiment, the voltage regulating phase shifting circuit comprises a plurality of identical reactors or transformers each having four alternating current windings and a direct current or control winding. The reactors include a four-legged core structure on each of the two central legs of which two of the alternating current windings are wound. The direct current winding is wound about both of the central core legs. The end terminals of one alternating current winding on each leg are connected together so that the four alternating current windings form two pairs; each pair including a winding on each of the two central legs of the reactor. The reactors are arranged in pairs with one pair of alternating current windings of each reactor connected in series with the corresponding pair of windings of the other reactor of the pair to form one phase of a three-phase delta-connected network. The phase terminals of the delta-connected network form the input terminals of the phase shifting circuit and are connected to the alternating current supply circuit. The remaining pairs of alternating current windings of the reactors of each phase of the network are connected in series between the input terminal common to the two remaining phases of the network and an output terminal. The direct current winding of one reactor in each leg of the three-phase network is connected in series with a variable resistor and a source of direct current potential, while the direct current control winding of the other reactor in each phase of the phase shifting network is connected to a second variable resistor and the same source of potential. The resistors in series with each group of control windings are varied in accordance with the voltage of the output circuit or other electrical condition to be controlled and in opposite directions so that the current flowing in one control winding of each phase increases when the current in the other winding decreases. The current flowing in the control windings varies the saturation of the legs of the core structure and varies the effective magnetic coupling between the alternating current windings connected between the input terminals and the alternating current windings connected between the input and output terminals. When the saturation of the core is varied, the voltage induced in the winding 43d, for example, for a given current through the winding 43a varies, and the change in the magnetic relationship of windings 43a and 43d is called a change in the effective magnetic coupling of these windings. The latter series connected alternating current windings are connected in phase opposition so that the output voltage is the same as the input voltage when the current through the two control windings in each phase of the network are equal. When the current in one control winding increases and the other decreases the voltage induced in one of the series connected windings between each input terminal and the corresponding output terminal increases while the other decreases so that the voltages appearing between the output terminals are shifted in phase with respect to the voltages impressed on the input terminals of the network. Since the impedance of series connected elements between the input terminals and between the output terminals is varied in opposite directions the interterminal resistance of both the input and output circuits of the phase shifting network remain substantially constant. The output of the phase shifting network is impressed on a second phase shifting network of similar construction which in the present case is a quarter-phase network for controlling a quarter-phase electric valve translating system. The direct current control windings of the second phase shifting circuit are energized in response to the current conducted by each group of valves of the quarter-phase valve converting system.

My invention will be better understood by reference to the following description taken in connection with the accompanying drawings and its scope will be pointed out in the appended claims. In the drawings, Fig. 1 is a schematic representation of one embodiment of our invention, Fig. 2 illustrates schematically the construction of the reactors utilized in the phase shifting circuit of Fig. 1, and Figs. 3 to 6 are vector diagrams showing voltage relations existing in the phase shifting circuits of the system illustrated in Fig. 1.

Referring to Fig. 1 of the drawings the alternating current circuit 10 is interconnected with a direct current circuit 11 by an electric valve translating apparatus including a transformer 12 having a Scott-connected primary winding 13 and secondary windings 14 and 15. Electric valves 16, 17, 18 and 19 interconnect the end terminals of the secondary windings 14 and 15 with one side of the direct current circuit 11. The valves may be of any type well known in the art and as illustrated, each comprises an envelope containing an ionizable medium and enclosing an anode 20, a cathode 21, an immersion igniter type of control electrode 22, and an auxiliary anode 23. The anodes 20 are connected to the end terminals of the secondary windings 14 and 15 of the transformer 12 while the cathodes 21 are connected together and to one of the direct current lines 11. The other direct current line is connected to the midpoint of the transformer windings 14 and 15 through the opposite end portions of the interphase transformer 24. Unidirectional control windings 25 and 26 are connected in series between the end terminal of the interphase transformer and the midpoint of transformer winding 14. Similarly, unidirectional control windings 27 and 28 are connected in series between the end terminal of the interphase transformer 24 and the midpoint of transformer winding 15. These control windings form part of a phase shifting circuit for automatically maintaining a balance between the current transmitted by the valves associated with windings 14 and 15 and will be described in greater detail at a later point in the specification.

The conductivities of the electric valves 16—19 are controlled by a control circuit including a voltage regulating phase shifting circuit 29, excitation transformer 30, load balancing phase shifting 31, and excitation circuits 32 and 33. The excitation circuits 32 and 33 are identical and like numbers have been used to indicate corresponding parts. Each of the excitation circuits includes a transformer 34 having a secondary winding 35 provided with a midtap connected to the direct current line 11 which interconnects the cathodes 21 of the electric valves 16—19. Each end terminal of the winding 35 in each of the excitation circuits 32 and 33 is connected to the cathode bus by parallel paths one of which includes the auxiliary anode 23 and the other of which includes the control electrode 22 of one of the electric valves 16—19. The electric path connecting the end terminal of the transformer with the immersion ignitor includes an electric valve or unilateral conducting device 36. Each of the transformers 34 includes primary winding 37 in series with which are connected a condenser 38 and a self-saturating inductive impedance element 39. As will be readily understood by those skilled in the art, the excitation circuits 32 and 33 are effective to impress periodic impulses on the immersion ignitor control electrode 22 when an alternating current potential is applied to the conductors 40 and 41 of the excitation circuits 32 and 33, respectively. The auxiliary anodes 23 function to relieve the immersion ignitor control member 22 of current as soon as the medium within the valve becomes ionized. The particular excitation circuit for applying the periodic potentials to the control members forms no part of the present invention, but certain features of this circuit are disclosed and claimed in Patents No. 2,190,774, Edwards, dated February 20, 1940, and No. 2,137,148, Suits, dated November 15, 1938, both assigned to the same assignee as the present invention.

In accordance with an important feature of the present invention an improved static phase shifting circuit 29 is provided for impressing on the primary winding 42 of excitation transformer 30 an alternating current potential which is variable in phase with respect to the anode-cathode potentials of the electric valves 16—19. In the particular embodiment illustrated, the phase shifting circuit 29 is energized from the alternating current circuit 10 and the amount of phase shift between the potentials of the circuit 10 and those impressed on the transformer 30 are automatically controlled in response to the voltage of the direct current circuit 11. In the particular form illustrated the phase shifting circuit includes six similarly constructed reactors 43—48, inclusive, each of which includes five windings designated by the number of the reactor with subscripts a to e, inclusive. The three input or phase terminals 49, 50 and 51 of the phase shifting circuit are connected directly to the three phase alternating current source 10. The output terminals 52, 53 and 54 of the phase shifting network are connected to the terminals of the Scott-connected primary winding 42 of the excitation transformer 30.

The construction of the reactors 43—48 will be better understood by reference to Fig. 2 in which the coils of reactor 43 are shown on the multi-legged core structure 55. The windings 43a and 43b are connected in parallel and wound on separate legs 56 and 57 of the core structure 55 in reverse relation. Similarly, windings 43d and 43e are wound on the legs 56 and 57, respectively, of the core structure in opposite directions and are connected in parallel in the same manner as the windings 43a and 43b. As will be more apparent as the description proceeds, the windings 43a—43b form essentially the primary windings of a transformer the secondary windings of which are 43d—43e. The effective coupling of the windings 43a—43b with windings 43d—43e is controlled by the control winding 43c which is wound about both core legs 56 and 57. The alternating current windings arranged in parallel and on different legs of the core are employed so that the effect of the direct current control winding is the same during both half waves of the alternating current potential.

Referring again to Fig. 1, the parallel windings 43a—43b are connected in series relation with the windings 44a—44b of reactor 44 between the input terminals 49 and 50. Similarly, the windings 45a—45b and 46a—46b of reactors 45 and 46 are connected between the input terminals 50 and 51, and the windings 47a—47b and 48a—48b are connected in series between the input terminals 51 and 49. The windings 43d—43e and 44d—44e are connected in series between the input or reference terminal 51 and the output terminal 54 in such a manner that the voltages induced therein by windings 43a—43b and 44a—44b, respectively, are opposed. Similarly, the windings 45d—45e and 46d—46e are connected in series between the input terminal 49 and the output terminal 52 and the windings 47d—47e and 48d—48e are connected between the input terminal 50 and output terminal 53. From the foregoing description it is apparent that the voltage between the output terminals 52 and 53 is the vectorial sum of the voltages between the input terminals 49 and 50 and the voltages across the coils 45d—45e, 46d—46e, 48d—48e, 49d—49e. The output voltages appearing between the other output terminals are likewise made up of the component voltages of the various series connected coils which are included therebetween. From one aspect the output voltages appearing between the terminals 52 and 53 for example may be considered as made up of one component which is constant and equal to the potential between two of the alternating current lines of the alternating current circuit 10 and two components which are vectorially perpendicular to the bisectors of the angles formed by the line voltage vectors which intersect at the input terminals. These additional voltage components which appear between the input and output terminals are made up of two components, both of which are variable in magnitude and opposed in phase relation so that when they are equal the output voltages are equal to the input voltages. These voltages are controlled, as previously mentioned, by the direct current windings 43c—48c which are wound about both legs 56 and 57 of the core structures 55 of reactors 43—48. The current flowing in these control windings is controlled in accordance with the voltage of the direct current circuit by means of a regulator 58 including variable resistors 59 and 60 which may be controlled by a suitable torque motor or as illustrated by a solenoid 61 energized in response to the voltage of the direct current circuit 11. A resistor 62 in series with the energizing coil of the solenoid is provided to permit initial adjustment of the regulator. Variable resistor 59 is connected in series with the control windings 44c, 46c, 48c and variable resistor 60 is connected in series with control windings 43c, 45c and 47c. The control resistor 59 and control windings connected in series therewith are connected in parallel with the resistor 60 and control windings in series therewith and across the direct current circuit 11. It is apparent from the drawing that as the voltage in circuit 11 varies, one of the resistors is gradually cut into the circuit while the other is cut out so that the amount of control current flowing in the control windings 43c, 45c and 47c, for example, decreases while the current flowing in the control windings 44c, 46c and 48c increases. Increased current in control windings 44c, 46c and 48c is effective to increase the undirectional flux in the core and reduce the effective coupling between windings 44a—44b, 46a—46b, 48a—48b and windings 44d—44e, 46d—46e, and 48d—48e, respectively. Similarly, a decrease in current in control windings 43c, 45c and 47c is effective to vary the saturation of the core and increase the effective coupling between windings 43a—43b, 45a—45b, 47a—47b and the windings 43d—43e, 45d—45e and 48d—48e, respectively.

A better understanding of the operation of the phase shifting circuit in response to the assumed changes in control current may be had from the consideration of the vector diagrams of Fig. 3 and Fig. 4 in which the central triangle of each figure represents the three-phase voltage vectors between the reference points or input terminals 49, 50 and 51, while the vectors $E_{43}$ to $E_{48}$ represent the voltages across the coils 43d—43e to 48d—48e connected between the input terminals 49, 50 and 51, and the output terminals 52, 53, 54, respectively. When all of the control windings 43c—48c are carrying the same amount of current, the vectors illustrated by numbers $E_{43}$ to $E_{48}$ are of the same length and under these circumstances it is apparent that the voltages between the output terminals 52, 53, 54 are in phase with and the same as those appearing between terminals 49, 50, 51. The voltage relations when the current through control windings 43c, 45c, 47c is decreased and the current through windings 44c, 46c, 48c is increased are illustrated in Fig. 4. It will be noted that the voltages $E_{44}$, $E_{46}$ and $E_{48}$ are decreased in magnitude as compared with those voltages shown in Fig. 3, which represents the conditions of the circuit when the currents flowing in the control windings are equal and that the voltages $E_{43}$, $E_{45}$ and $E_{47}$ are increased. This change in the two voltage components included between each input terminal and its corresponding output terminal has the effect of moving the voltage of the output terminals along a line which is normal to the bisectors of the angle formed by the intersecting line voltage vectors. The three-phase output voltages resulting are shown by the dotted triangle in Fig. 4. In Figs. 3 and 4 the vectors representing voltages $E_{43}$, $E_{45}$, and $E_{47}$ have been bodily displaced with respect to the vectors representing voltages $E_{44}$, $E_{46}$ and $E_{48}$ for purposes of illustration. These vectors actually extend along the same line and overlap varying amounts depending on their relative magnitudes. It is apparent from the foregoing description that if the currents in the control windings are varied in the opposite direction from that assumed in the foregoing example, the voltages appearing between terminals 52, 53 and 54 will be shifted in the opposite direction with respect to voltages impressed on the terminals 49, 50 and 51. Since the reactance of the windings of the reactors 43 and 44 connected in series between input terminals 49 and 50 are varied in opposite directions in response to a change in the controlled condition, the total impedance between input terminals 49 and 50 remains substantially constant during operation of the phase shifter. Since similar action takes place between all of the input terminals and between the output terminals the interterminal impedance in both the input and output circuits remains substantially constant regardless of the amount of phase shift for which the circuit is operating. This feature is a distinct advantage and renders the amount of phase shift obtained independent of the current drawn from the phase shifter.

A phase shifting circuit 31 is provided for adjusting the phase of the excitation potential of valves 16 and 17 with respect to the valves 18 and 19 in order to maintain a division of load current between these groups of valves. This phase shifting circuit is in general the same as the phase shifting circuit 29, which has been described in detail, and is made up of four reactors 63, 64, 65 and 66 each of the same construction as illustrated in Fig. 2 and comprising four alternating current windings and a control winding. The alternating current windings have been numbered 63—66 with subscripts $a$, $b$, $d$ and $e$ in the same manner as was done in connection with the phase shifting circuit 29. Windings 63a—63b and 64a—64b are connected in series between input terminals 67 and 68 and windings 65a—65b and 66a—66b are connected in series between the input terminals 68 and 69. The output voltages of phase shifting circuit 29 are impressed on the input terminals 67—68 and 68—69 through the transformer secondary windings 70 and 71 of the quarter-phase transformer 30. Output terminals 68 and 72 of phase shifting circuit 31 are connected to conductors 40 of the excitation circuit 32 and output terminals 68 and 73 are connected to the conductors 41 of the excitation circuit 32. Windings 65d—65e and 66d—66e which are electro-magnetically associated with the windings 65a—65b, 66a—66b energized from transformer secondary winding 71 are connected in series and in phase opposition between terminals 67 and 72 so that a voltage component in phase or phase opposition with the voltage of winding 71 is added to the voltage impressed on terminals 67 and 68 by the winding 70. When the voltages induced in windings 65d—65e and 66d—66e are equal the voltage appearing between output terminals 68 and 72 is the same as the voltage impressed on input terminals 67 and 68. The magnitude of the voltage components introduced between terminals 67 and 72 is controlled by the current flowing in control windings 26 and 28 associated with reactors 66 and 65, respectively. Similarly, windings 64d—64e, and 63d—63e which are electromagnetically associated with the windings 63a—63b and 64a—64b are connected in series between terminals 69 and 73. The magnitude of the voltage components introduced between terminals 69 and 73 is determined by the control windings 25 and 27 which are connected to be energized in accordance with the current flowing through the valves 16, 17 and 18, 19, respectively. The windings between terminals 69 and 73 are also wound in phase opposition so that when the magnitude of the voltage of the two windings is equal the voltage between input terminals 68 and 69 is the same as the voltage between terminals 68 and 73 which impress the periodic control potential on conductors 41. From the foregoing description it is apparent that when the same current is flowing through valves 16 and 17 as that flowing through valves 18 and 19, the currents flowing through all of the control windings 25—28 are the same and the voltages impressed on conductors 40 and 41 will be in phase with the voltages of the secondary windings 70 and 71, respectively. If valves 16 and 17, for instance, start to carry more current than the valves 18 and 19, more current will flow through control windings 25 and 26 and less current through control windings 27 and 28. With more current flowing through control windings 25 and 26 the component of voltage introduced between terminals 67 and 72 and 69 and 73 by the windings of reactors 64 and 66 will be decreased and with more current flowing through control windings 27 and 28 the voltage components introduced between terminals 67 and 72, and 69 and 73 by the windings of reactors 65 and 63, respectively, will be increased. Since it is apparent that in order to restore balanced current conditions between the groups of valves the excitation of the valves 16 and 17 should be retarded while the excitation of the valves 18 and 19 should be advanced, the windings connected between terminals 67 and 72 are arranged so that under the conditions assumed the voltage introduced between the terminals 67 and 72 is in a direction to retard the phase of the excitation potential, while for the same assumed conditions of current through the control windings 25—28 the resulting potential between terminals 69 and 73 is such as to advance the phase of the potential between terminals 68 and 73 with respect to the potential impressed on terminals 68 and 69.

Figs. 5 and 6 are vector diagrams representing the voltage relation between the various input and output terminals of the phase shifting circuit 31. Fig. 5 shows the voltage relations when balanced currents are conducted by the groups of valves 16, 17 and 18, 19. Fig. 6 shows the changed voltage relations existing under the assumed conditions of unbalance when the valves 16 and 17 are tending to conduct more current than the valves 18 and 19. It is to be noted that the voltage between terminals 68 and 72 is retarded with respect to the voltage between terminals 67 and 68, while the voltage between terminals 68 and 73 is advanced with respect to the voltage appearing between terminals 68 and 69.

In some cases it may be desirable to provide the reactors 63 to 66 with presaturating windings energized from a source of direct current potential. It is also apparent that the control windings need not be connected directly in series with the groups of valves as illustrated, but may be energized in any suitable manner so that they conduct current proportional to the current conducted by the group of valves with which they are associated.

The operation of the electric valve converting system embodying our invention is believed to be readily understood from the foregoing detailed description of the operation of phase shifting circuits 29 and 31. The electric valves 16 to 19 are rendered conductive periodically to transmit energy from alternating current circuit 10 to direct current circuit 11. By controlling the phase of the excitation potentials applied to the control electrodes 22 it is possible to determine the moment in the anode-cathode voltages of the electric discharge valves at which they are rendered conductive and thereby control the voltage of the direct current circuit 11. As previously explained in detail, the phase shifting circuit 29 automatically controls the phase of the potential applied to the primary winding 42 of transformer 38 in accordance with the voltage of the direct current circuit 11 by means of the variable resistors 59 and 60 which are included in circuit with the control windings of the reactors 43 to 48 of the phase shifting circuit 29. The division of load current between the valves associated with winding 14 and the valves associated with winding 15 is maintained by controlling the phase of the excitation potentials applied to the control electrodes of these valves in accordance with the amount of current conducted by each group of valves. This control is accomplished through the phase shifting circuit 31 which operates in a manner similar to that described in connection with phase shifting circuit 29 with the exception that the voltage component impressed between the input and output terminals is such as to advance the phase of the excitation of the group of valves carrying less than their share of the load and to retard the phase of the excitation of those valves carrying more than their share of the load.

While I have shown and described a particular embodiment of my invention, it will be obvious to those skilled in the art that changes and modifications may be made without departing from my invention in its broader aspects, and I, therefore, aim in the appended claims to cover all such changes and modifications as fall within the true spirit and scope of my invention.

What I claim as new and desire to secure by Letters Patent of the United States is:

1. A phase shifting network comprising a polyphase input circuit including a plurality of input phase terminals, a polyphase output circuit including a plurality of output phase terminals, means interconnecting each input phase terminal with a corresponding output phase terminal for producing voltage components in phase opposition and differing in phase from the voltage appearing between the input phase terminal with which said means is associated and any of the remaining input phase terminals, and means for varying the magnitude of at least one of said opposed voltage components to shift the phase of the voltage appearing between said output phase terminals with respect to the voltage impressed on said input phase terminals.

2. A phase shifting circuit comprising an inductive network including a plurality of inductive windings and a plurality of input terminals, a plurality of output terminals, other inductive windings interconnecting certain of said input terminals and a corresponding output terminal, said last mentioned inductive windings being magnetically coupled with certain of the windings of said network and connected to produce voltage components between said input and said output terminals which are in phase opposition so that when said components are equal in magnitude the voltage appearing between said output terminals is in phase with the voltage impressed on said input terminals, and means for varying the magnitude of at least one of said opposed voltage components to vary the phase relation of the voltage appearing between said output terminals with respect to the voltage impressed on said input terminals.

3. A phase shifting circuit comprising in combination, a plurality of input terminals, a plurality of output terminals, serially connected inductive windings interconnecting said input terminals and forming a network having a plurality of branches each including two windings in series, other inductive windings connected in series between each of said input terminals and a corresponding output terminal and magnetically coupled with certain of the windings of said network so that components of voltage in phase opposition are produced between each input terminal and a corresponding output terminal so that when said voltage components are equal the voltage appearing between said output terminals is in phase coincidence with the voltage impressed on said input terminals, and means for controlling the effective magnetic coupling between the windings connected between said input terminals and the windings connected between said input and output terminals to vary the magnitude of at least one of said opposed voltage components.

4. A phase shifting circuit comprising in combination, a plurality of input terminals, a plurality of output terminals, serially connected inductive windings interconnecting said input terminals to form a network having a plurality of branches each including two windings in series, other inductive windings connected in series between each of said input terminals and a corresponding output terminal, said last mentioned windings being magnetically coupled with certain of the windings of said network to produce voltage components in phase opposition and differing in phase from the voltage appearing between the input terminal with which they are associated and any of the remaining input terminals, and a control winding for varying the magnetic coupling between said inductive windings and said other inductive windings to vary the magnitude of at least one of said opposed voltage components to shift the phase of the voltage appearing between said output terminals with respect to the voltage impressed on said input terminals.

5. A three-phase inductive network including three input terminals, three output terminals, means connected between each of said input terminals and a corresponding output terminal for producing potential components in phase and in phase opposition to the potential appearing between the two remaining input terminals, and means for varying the magnitude of said opposed potential components appearing between said input and output terminals simultaneously in opposite directions to shift the phase of the potentials appearing between said output terminals with respect to the potentials impressed between said input terminals.

6. A phase shifting network comprising in combination a plurality of transformers each including a primary winding, a secondary winding, a control winding and a core structure, a plurality of output terminals, the primary windings of said transformers being connected to form an n-phase network having n input terminals, the secondary winding associated with each primary winding being connected in series between an input terminal other than the one with which its associated primary is associated and an output terminal, means for varying the energization of the direct current winding associated with each transformer to vary the effective magnetic coupling between said primary and secondary windings and thereby to vary the phase relation between the potentials impressed on said input terminals and the potentials appearing between said output terminals.

7. A phase shifting circuit comprising a network of inductive windings including a plurality of input terminals, a plurality of output terminals, an inductive element interconnecting each input terminal with a corresponding output terminal, each of said inductive elements being magnetically coupled with certain of the windings of said network so that a component of voltage is induced therein differing in phase from the voltage impressed between the input terminal with which it is connected and either of the adjacent input terminals, and means for varying the magnitude of the voltage component induced in said inductive elements to vary the phase of the voltages appearing between said output terminals with respect to the phase of the voltages appearing between said input terminals.

8. A phase shifting circuit comprising a polyphase network of inductive windings including a plurality of input terminals, a plurality of output terminals, an inductive element interconnecting each input terminal with a corresponding output terminal, each of said inductive elements being magnetically coupled with certain of the windings of said network so that a component of voltage is induced therein differing in phase from the voltage impressed between the input terminal with which it is connected and either of the adjacent input terminals, and means for varying the effective magnetic coupling between said inductive elements and the windings of said inductive network with which they are associated to vary the magnitude of the voltage components impressed between the input and output terminals by said inductive elements.

9. A phase shifting circuit comprising in combination a plurality of input terminals, a plurality of output terminals, serially connected inductive windings interconnecting said input terminals and forming a closed network, other inductive windings connected between each of said input terminals and a corresponding output terminal and magnetically coupled with certain of the windings of said closed network so that a potential is induced in each of said other windings differing in phase relation from the potential appearing between the input terminal with which it is associated and any of the remaining input terminals, and means for varying the magnitude of the voltage induced in the windings connecting said input and output terminals to shift the phase of the potential across said output terminals with respect to the phase of the potential impressed on said input terminals.

10. A phase shifting network comprising in combination, a plurality of transformers each including a primary winding, a secondary winding, a control winding and a core structure, a plurality of output terminals, the primary windings of said transformers being connected in a closed loop with alternate terminals providing input terminals so that two windings in series are included between adjacent input terminals, the secondary windings associated with the series connected primaries between adjacent input terminals being connected in series and in opposed relation between an input terminal other than the one with which the primary windings are associated and an output terminal, means for simultaneously varying the energization of the direct current winding associated with each transformer connected between adjacent input terminals in opposite directions to vary the effective magnetic coupling between said primary windings and said secondary windings.

11. A phase shifting network comprising in combination, a plurality of transformers each including a primary winding, a secondary winding, a control winding and a core structure, a plurality of output terminals, the primary windings of said transformers being connected in a closed loop with alternate terminals providing input terminals so that two windings in series are included between adjacent input terminals, the secondary windings associated with the series connected primaries between adjacent input terminals being connected in series and in opposed relation between an input terminal other than the one with which the primary windings are associated and an output terminal, means for simultaneously varying the energization of the direct current winding associated with each transformer connected between adjacent input terminals in opposite directions to vary the effective magnetic coupling between said primary windings and said secondary windings and thereby to vary the phase relation between the potentials impressed on said input terminals and the voltages appearing between said output terminals while maintaining the inter-terminal impedance of said networks substantially constant.

12. A static phase shifting circuit comprising in combination a plurality of input terminals, a plurality of output terminals, a plurality of series connected inductive windings interconnecting certain of said input terminals, series connected inductive elements connected between each of said input terminals and a corresponding one of said output terminals and magnetically coupled with the series connected inductive windings interconnecting input terminals other than the one with which said elements are associated, means for varying simultaneously the impedance of the series connected elements between said input terminals in opposite directions so that the impedance between the input terminals remains substantially constant, said last mentioned means being effective to vary the magnitude of the voltage induced in the inductive windings interconnecting said input and output terminals to shift the phase of the potentials appearing between said output terminals with respect to the potentials impressed on said input terminals.

13. A phase shifting circuit comprising an $n$-phase network including $2n$ reactor elements each including two alternating current windings and a direct current winding, said windings being connected to form an $n$-phase network having a first alternating current winding of each of two of said reactors connected in series in each phase of the network, alternate common terminals of said first alternating current windings forming input terminals for said $n$-phase network, $n$ output terminals, the second alternating current windings of each of said reactor elements being arranged in pairs and connected in series between an output terminal and an input terminal differing from the input terminals with which the first alternating current windings of the same reactor elements are associated, and means for controlling the energization of the direct current winding associated with the reactor elements in each phase to vary the magnitude of the voltage component induced in each of the series connected windings interconnecting the input and output terminals and thereby vary the phase relation between the voltage impressed on said input terminals and the voltage appearing between said output terminals.

14. In combination, a supply circuit, a load circuit, electric translating apparatus interconnecting said circuits including a plurality of electric valves arranged to operate in parallel and each including a control member, a control circuit for energizing said control members including a source of polyphase periodic potential and a phase shifting network for maintaining a predetermined division of load between said parallel operated valves including a plurality of inductive windings connected in series across each phase of said source of polyphase periodic potential, inductive windings connected in series with each phase of said source of potential and magnetically coupled with the windings of a different phase of said source of potential for producing a series component of voltage having a phase relation dependent upon the phase relation of said other phase, and means for varying the magnitude of said series component in accordance with the current conducted by each of said parallel electric valves to automatically shift the phase of the periodic potentials applied to said control members to maintain a predetermined division of load between said parallel operating valves.

15. In combination, a supply circuit, a load circuit, electric translating apparatus interconnecting said circuits including a plurality of groups of electric discharge valves, each of said valves including a control member, means for supplying periodic potentials to said control members to control the conductivities of said electric valves and means for varying the phase relation of the potentials of one of said groups of valves with respect to the other of said groups to maintain a division of load between said groups of valves comprising a phase shifting network including a source of periodic potential, means for adding two potential components to said source of potential which are in opposed phase relation, means for controlling the magnitude of one of said potential components in response to the current conducted by one group of said valves, and means for controlling the magnitude of the other opposed potential component in accordance with the current conducted by the other group of said valves so that the relative magnitude of said opposed potentials is controlled in accordance with the load division between said groups of valves.

16. A phase shifting circuit comprising a plurality of input terminals and a plurality of output terminals, a plurality of series connected inductive impedance elements interconnecting certain of said input terminals to provide a network having a plurality of branches each of which includes two inductive impedance elements in series, means for simultaneously varying the inductive impedance of the impedance elements of each branch in opposite directions so that the impedance included between said input terminals remains substantially constant, said last mentioned means being effective to control the phase relation of the voltage appearing between said output terminals with respect to the voltage impressed on said input terminals.

17. In combination, a supply circuit, a load circuit, electric translating apparatus interconnecting said circuit for transmitting energy therebetween and including a plurality of electric discharge valves each having a control electrode, a control circuit for controlling the energization of said control electrodes including a source of periodic potential and a phase shifting circuit for controlling the phase of the potentials applied to said control electrodes, said phase shifting circuit including a plurality of input terminals connected to said source of periodic potential, a plurality of output terminals connected to energize said control electrodes, an inductive network interconnecting said input terminals and inductive windings connecting certain input terminals with corresponding output terminals and magnetically coupled with certain of the windings of said inductive network, and control windings energized in response to the voltage of said load circuit for controlling the magnitude of the potential introduced between said input and output terminals to control the phase of the excitation potentials applied to said control electrodes.

18. The combination of an electric valve converting system comprising a supply circuit, a load circuit, electric translating apparatus interconnecting said circuits and including a plurality of electric discharge valves each having a control electrode, with a control circuit for controlling the energization of said control electrodes including a source of periodic potential and a phase shifting circuit having a plurality of input terminals and a plurality of output terminals, means for producing voltage components in phase opposition between certain of said input terminals and a corresponding output terminal, said voltage components differing in phase from the potential appearing between the input terminal with which they are associated and any of the remaining input terminals, and means responsive to an electrical condition of one of the circuits interconnected by said translating apparatus for controlling the magnitude of at least one of said voltage components to shift the phase of the potentials applied to said control electrodes.

MARTIN A. EDWARDS.

CERTIFICATE OF CORRECTION.

Patent No. 2,313,526. March 9, 1943.

MARTIN A. EDWARDS.

It is hereby certified that error appears in the printed specification of the above numbered patent requiring correction as follows: Page 2, second column, line 13, for "shifting 31," read --shifting circuit 31,--; page 7, second column, line 4, for "the inductive impedance of the impedance" read --the impedance of the inductive impedance--; and that the said Letters Patent should be read with this correction therein that the same may conform to the record of the case in the Patent Office.

Signed and sealed this 4th day of May, A. D. 1943.

(Seal)

Henry Van Arsdale,
Acting Commissioner of Patents.